United States Patent [19]

Pattee

[11] Patent Number: 5,374,352
[45] Date of Patent: Dec. 20, 1994

[54] UNIVERSAL RECYCLED WASH WATER SYSTEM

[76] Inventor: Harley J. Pattee, 10143 Allenby Ct., Orlando, Fla. 32821

[21] Appl. No.: 41,767

[22] Filed: Apr. 2, 1993

[51] Int. Cl.$^5$ .................... B01D 36/04; B01D 24/14; C02F 9/00

[52] U.S. Cl. .................... 210/104; 210/105; 210/124; 210/127; 210/128; 210/129; 210/167; 210/172; 210/195.1; 210/196; 210/257.1; 210/258; 210/259; 210/265; 210/266; 210/295; 210/416.1; 210/908; 134/110; 134/111; 134/123

[58] Field of Search ............... 210/104, 105, 123, 124, 210/127, 128, 129, 167, 172, 195.1, 196, 257.1, 258, 259, 266, 265, 295, 299, 908, 416.1; 134/109, 110, 111, 123

[56] References Cited

U.S. PATENT DOCUMENTS

| | | |
|---|---|---|
| 1,651,045 | 11/1927 | Smith . |
| 2,660,744 | 12/1953 | Cockrell . |
| 2,862,222 | 12/1958 | Cockrell . |
| 2,922,173 | 1/1960 | Lind . |
| 3,219,188 | 11/1965 | Hirs . |
| 3,263,341 | 8/1966 | Allen . |
| 3,384,239 | 5/1968 | Berardi . |
| 3,502,215 | 3/1970 | Cahan . |
| 3,550,778 | 12/1970 | Kesselman . |
| 3,616,917 | 11/1971 | Hellwege . |
| 3,774,625 | 11/1973 | Wiltrout .................... 134/104 |
| 3,810,544 | 5/1974 | Armstrong . |
| 3,850,805 | 11/1974 | Armstrong . |
| 3,911,938 | 10/1975 | Wiltrout . |
| 3,923,658 | 12/1975 | Lancaster . |
| 4,029,114 | 6/1977 | Wiltrout . |
| 4,104,164 | 8/1978 | Chelton . |
| 4,168,231 | 9/1979 | Allen . |
| 4,168,232 | 9/1979 | Allen . |
| 4,652,368 | 3/1987 | Ennis . |
| 5,093,012 | 3/1992 | Bundy . |
| 5,160,430 | 11/1992 | Gasser . |
| 5,223,150 | 6/1993 | Bundy . |

FOREIGN PATENT DOCUMENTS

| | | |
|---|---|---|
| 2556674 | 8/1976 | Germany . |
| 2626697 | 12/1977 | Germany . |
| 2831607 | 7/1978 | Germany . |
| 2841111 | 4/1980 | Germany . |
| 2910533 | 9/1980 | Germany . |
| 54-13655 | 1/1979 | Japan . |
| 54-30660 | 7/1979 | Japan . |
| 56-15281 | 4/1981 | Japan . |
| 56-142730 | 11/1981 | Japan . |

*Primary Examiner*—Thomas M. Lithgow
*Attorney, Agent, or Firm*—Michael K. Gray

[57] ABSTRACT

A universal recycled wash water plant having a collector tank through which collected wash water and rinse water is channeled to a grease/oil/water separation tank which separates oil and grease from the water and which holds the oil-separated water in a pump compartment. The water in the pump compartment is pumped to two sand filter tanks which removes suspended trace oil and other suspended solids from the water received from the pump compartment. The water upon passing through the sand filter tanks is channeled to a balancing tank and pumped by means of a recirculating pump to a separator which removes solid particles up to six microns in size from the water received from the balancing tank. From the separator the water is channeled in desired proportions to a carbon filter and to a wash water tank. The carbon filter removes any remaining soap elements from the water before the clarified water is channeled into a rinse water tank. The rinse water tank and wash water tank can provide the same water over and over again for washing purposes. The system is provided with valves, switches, and solenoids which can be activated to achieve desired levels of water in the balancing tank, wash water tank and rinse tank.

14 Claims, 4 Drawing Sheets

UNIVERSAL RECYCLED WASH WATER SYSTEM

BACKGROUND OF THE INVENTION

1. Field of the Invention

The present invention pertains to wash water recycle systems. More particularly, the present invention pertains to a closed-loop system in which the wash water and rinse water used to clean an object is collected, cleaned and re-used for washing purposes over and over again.

2. Background of the Invention

At the present time, environmental concerns and regulations mandate that wash water runoff be controlled and collected to prevent possible environmental contamination and pollution.

In washing operations such as in systems designed to wash trucks and automobiles, great amounts of water are wasted if the wash and rinse water is not collected and cleaned for re-use. Further, in addition to water costs, without a water recycle system, additional expense is incurred in city or county water treatment and sewer system bills.

When washing trucks and automobiles, the water used in the wash collects hydrocarbons originating from petroleum distillates. Water recycle systems of the prior art have not demonstrated an adequate facility for removing these hydrocarbons from the recycled water.

As water becomes an ever rarer and more precious commodity, much money and resources can be saved by a system which efficiently and salubriously re-utilizes the same water over and over again for washing purposes. Thus, a need is seen for a wash water recycle system which can clean and purify the water used in washing a car or truck so as to achieve a superior wash with each subsequently washed vehicle.

SUMMARY OF THE INVENTION

Accordingly, one object of the present invention is to provide a universal recycled water system which will eliminate wash water runoff into the ground.

Yet another object of the present invention is to provide a universal recycled water system which will clean and re-utilize wash water and rinse water so that the same water can be used over and over again to achieve superior washes.

Still another object of the present invention is to reduce the amount of water needed at a wash operation so as to reduce water costs and maximize the efficient use of water.

A further object of the present invention is to realize a universal recycled wash water system which will effectively remove hydrocarbons emanating from petroleum distillates from the collected wash and rinse water.

These and other valuable objects and advantages of the present invention are provided by a recycled wash water system having a collection tank for collecting and combining rinse water and wash water which has been used by a washing system to wash an object. The collection tank separates heavy debris from the collected water to create debris-separated water.

A grease/oil/water separator tank, connected to said collection tank, has means for separating heavier-than-water solids (i.e. sludge) and lighter-than-water grease and oil from the debris-separated water to create oil-separated water, the grease/oil/water separator tank includes a pumping tank for holding the oil-separated water.

A sand filtering means, connected to the grease/oil/separator tank, removes suspended solids, trace oil, and hydrocarbons derived from petroleum distillates from the oil-separated water received from the grease/oil/water separator tank to create hydrocarbon-separated water. A balancing tank, connected to the sand filtering means, receives the hydrocarbon-separated water from the sand filtering means, the balancing tank being provided with water-level control means for regulating an amount of water in the balancing tank. A recirculating pump connected to the balancing tank pumps hydrocarbon-separated water to a separator means, the recirculating tank in essence pumps water through the entire system. The recirculating pump is electrically connected to a pump control means in the balancing tank.

The separator means separates solid particles from the hydrocarbon-separated water to create new wash water. A carbon filter means is connected to the separator means, for removing soap particles from the new wash water to create new rinse water. A rinse water tank is connected to the carbon filter means for storing the new rinse water received from the carbon filter means. A wash water tank, connected to said separator means, holds the new wash water received from the separator means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

When referring to the drawings, it should be understood that like reference numerals designate identical or corresponding parts throughout the respective figures.

THE DETAILED DESCRIPTION OF THE INVENTION

Figure 1:
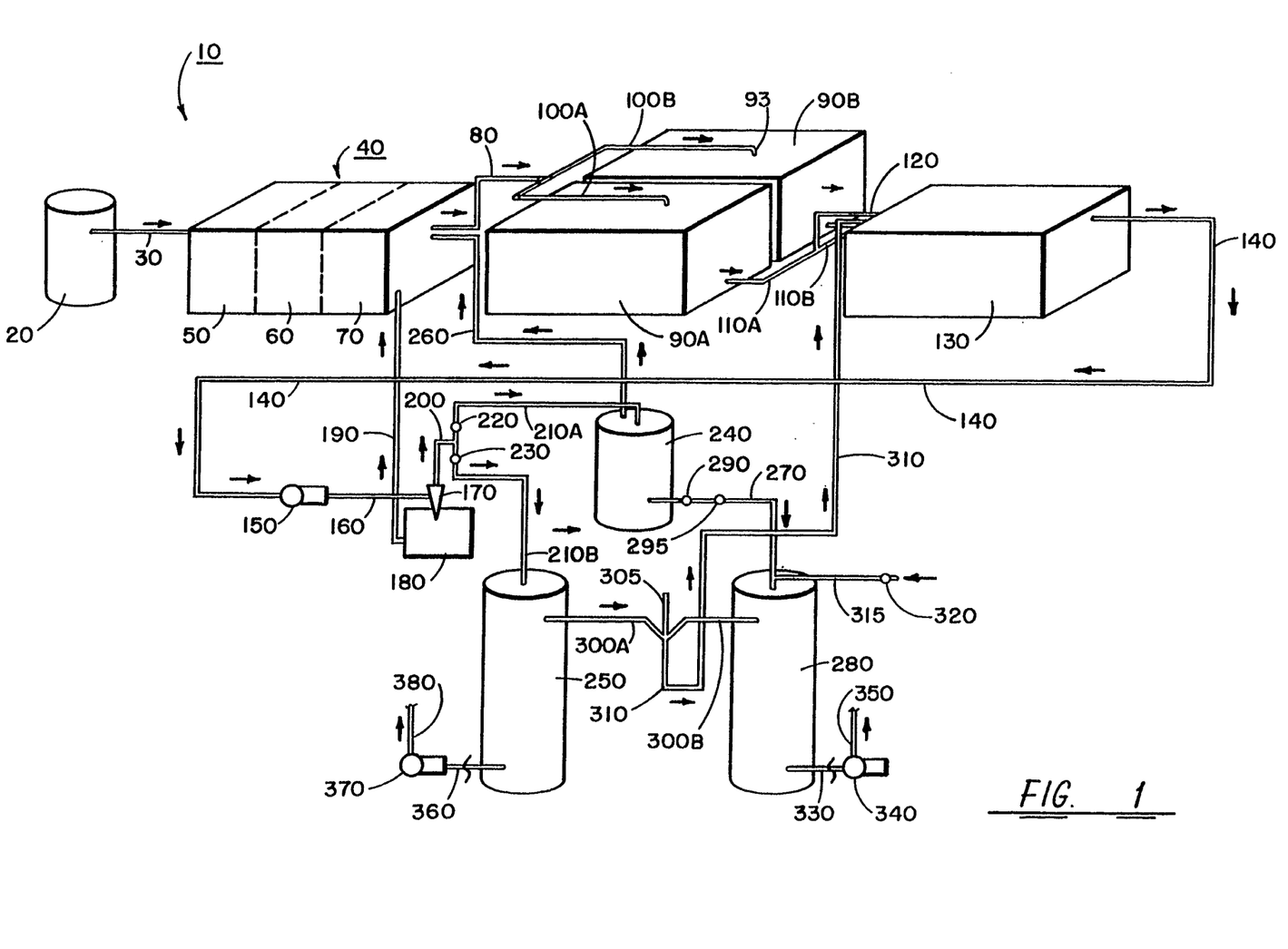
FIG. 1 is a schematic illustration of the Universal Recycled Water System of the present invention.

With reference to FIG. 1, the universal recycled water system 10 of the present invention is provided with a collection tank 20 which is connected by PVC pipe 30 to a grease/oil/water separator 40. Separator 40 consists of a settling tank 50, a trap tank 60, and a pump tank 70 which are integrally connected. PVC pipe 80 connects the pump tank 70 to sand filter tanks 90A and 90B. Pipe 80 connects to form right angles with dual spray bars 100A and 100B.

Still with reference to FIG. 1, exiting the sand filter tanks 90A and 90B are PVC pipes 110A and 110B, respectively. Pipes 110A and 110B connect to PVC pipe 120 which connects to balance tank 130. Balance tank 130 is connected by PVC pipe conduit 140 to system recirculating pump 150. PVC pipe 160 connects recirculating pump 150 with separator 170.

Separator 170 removes any remaining solid particles over 6 microns in size from the water which enters it. Captured solids are discharged at the bottom of the cone-shaped separator 170 by means of water sprayed into a sludge cart 180. Water is prevented from overflowing from the sludge cart 180 in that the cart 180 connects to PVC pipe 190 which returns water from sludge cart 180 to pump tank 70 of the grease/oil/separator 40.

The water which has been processed through separator 170 exits at the top of separator 170 into PVC pipe 200 which bifurcates to connect to filter-line pipe 210A and soap tank line pipe 210B. A first in-line gate valve 220 in filter-line pipe 210A regulates the amount of water which is allowed to reach the carbon filter 240 from separator 170. A second in-line gate valve 230 is positioned in soap-tank line pipe 210B to regulate the amount of water from separator 170 which is allowed to reach the soap tank 250. Valve 230 is always open to a certain degree and is adjusted to regulate the amount of water pressure experienced by carbon filter 240. Filter-line pipe 210A connects to carbon filter 240 which serves to remove soap substances from the water it receives via pipe 210A.

Rinse water input pipe 270 exits carbon filter 250 to bring carbon-filtered water to rinse water tank 280. A solenoid valve 290 and valve 295 are located in input pipe 270, valve 290 opening and closing according to the water needs of rinse tank 280. Valve 295 can be adjusted to regulate the amount of pressure in Carbon Filter 240 as greater pressure enhances the filtering capabilities of the carbon filter 240.

Back wash water from carbon filter 240 is directed through two-inch PVC pipe 260 to pump tank 70 of grease/oil/water separator 40. Water exiting soap tank 250 through line 300A and water exiting rinse water tank 280 through line 300B is channeled into PVC pipe 310 and recirculated to the balance tank 130. An air pipe 305 connects to lines 300A and 300B and to pipe 310. Air pipe 305 serves to aerate the water in the system.

Tap water line 315 is provided with a solenoid valve 320 which opens to allow tap or faucet water to be introduced to rinse tank 280 as desired. Line 330 connects the rinse tank 280 to a pump 340 to allow rinse water to be directed to washing equipment through line 350. Line 360 connects the soap tank 250 to pump 370 to allow soap water to be directed to washing equipment through line 380.

The universal recycled water system 10 of the present invention can be utilized for many types of washing systems. The prototype of the present invention was designed to handle a bus wash operation. However, the present invention may be utilized in car washes or in conjunction with washing systems designed to wash a variety of objects.

The universal recycle wash water system 10 is a closed loop system which does not discharge any water. All the water is cleaned and used over and over again. Tap water through tap water line 315 connected to rinse tank 280 is introduced into the system 10 to replenish water which is lost through evaporation and absorption. The prototype of the present invention is a one hundred gallon per minute plant. This description includes component sizes and rates which are optimized for that volume of plant. However, the teachings of the present invention can be implemented to create universal recycled wash water systems for virtually any size and capacity of wash operation.

Figure 2:
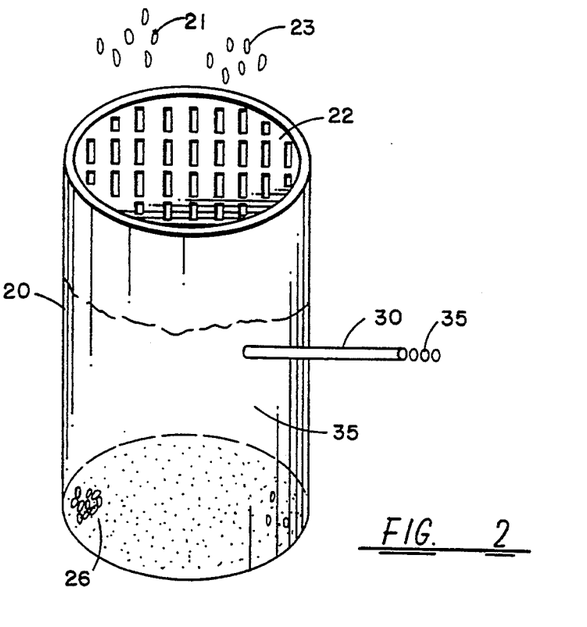
FIG. 2 is a schematic side-view, see-through illustration of the collection tank according to the present invention.

With reference to FIGS. 1 and 2, the prototype collection tank 20 according to the present invention is a 750 gallon precast, smooth finish concrete tank, 3000 PSI specification, with pea gravel aggregate and no void. The tank measures 86 inches in length, 60 inches in width and 56 inches in depth. Collection tank 20 is located under a wash bay for purposes of collecting all wash water 21 and rinse water 23. Solid debris 26 from the rinse water 21 and wash water 23 sinks to the bottom of the collection tank 20. Thus the water in the collection tank 20 lying above the debris 26 is debris-separated water 35. The rinse water 21 and wash water 23 are collected through a grate 22 having 1½ inch by three inch openings.

Still with reference to FIG. 2, the grate 22 of collection tank 20 is positioned at the lowest level of a sloped gradient of a wash bay (not shown in FIG. 2) to allow all the wash water 23 and rinse water 21 to pass through the grate 22 into the collection tank 20 to become debris-separated water 35. Debris-separated water 35 exits the collection tank 20 via PVC pipe 30. PVC pipe 30 is schedule forty PVC pipe having a four inch diameter and is positioned approximately one foot below the grate 22. The water flow through pipe 30 (as shown in FIG. 2) is by gravity flow. Alternatively, water flow from the collection tank 30 can be accomplished by means of a submersible pump mounted on a concrete platform above the PVC pipe 30.

Figure 3A:
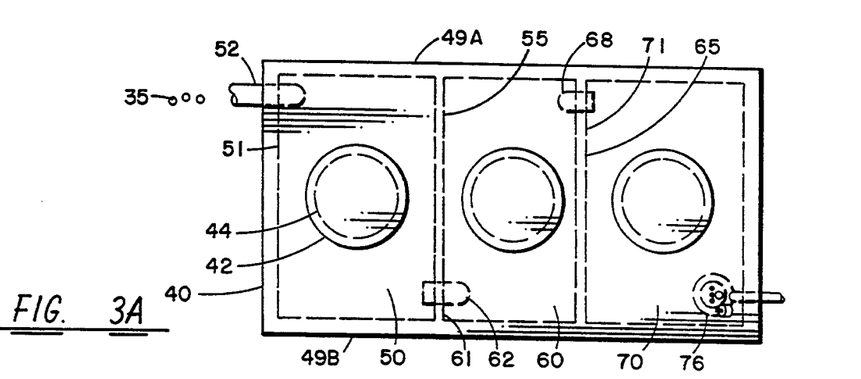
FIG. 3A is a top view of the grease/oil/water separator according to the present invention.
Figure 3B:
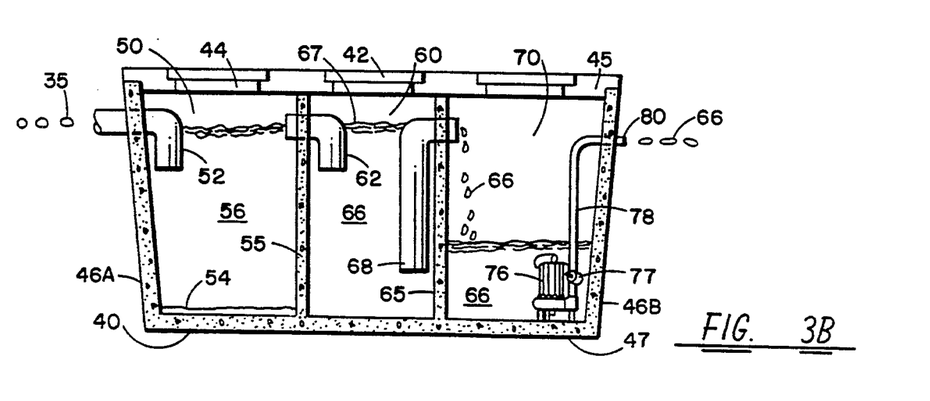
FIG. 3B is a cutaway side-view illustration of the grease/oil/water separator according to the present invention.

With reference to FIGS. 1, 3A and 3B, the debris-separated water 35 which exits collection tank 20 through pipe 30 enters grease/oil/water separator tank 40. Separator tank 40 consists of three tanks or compartments which comprise settling tank 50, trap tank 60 and pump tank 70. All three of the respective tanks (i.e., tanks 50, 60 and 70) in the prototype of the present invention have a capacity of approximately 350 gallons with the outside dimensions of tank 40 measuring 10' by 5' by 4'3".

Figure 4A:
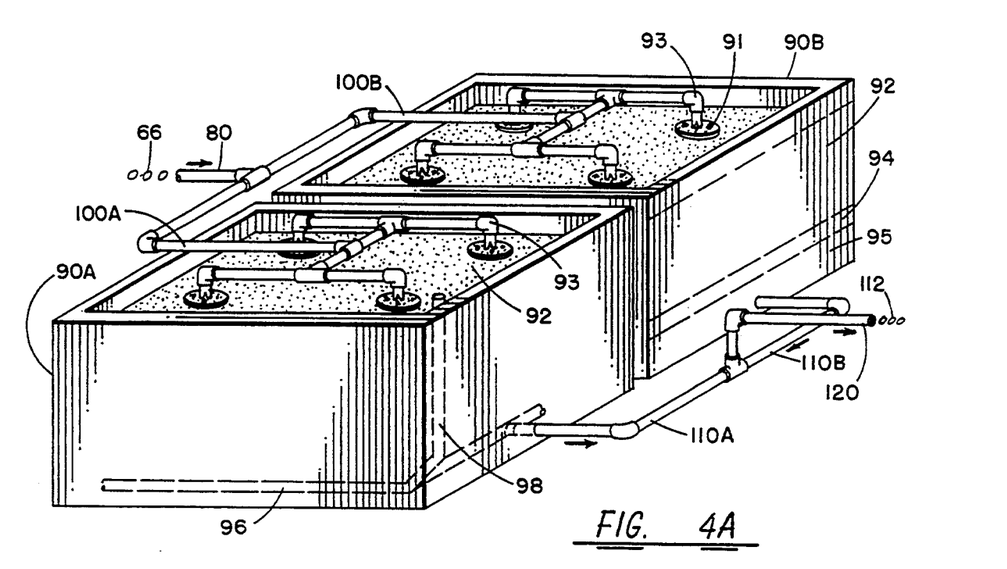
FIG. 4A is a schematic side-view, partial see-through illustration of the sand filters according to the present invention.

Grease/oil/water separator tank 40 is a precast tank made of 3000 PSI concrete, pea gravel aggregate, containing no voids and a smooth finish. Tank 40 is of integral construction and is comprised of tapered ends 46A and 46B, bottom 47 and sides 49A and 49B, with 3 inch baffles 55 and 65 which extend across the sides 49A and 49B to define the respective tanks 50, 60 and 70. A concrete lid 45 encloses the tanks 50, 60 and 70. Three covers 42 allow access to settling tank 50, trap tank 60 and pump tank 70 through holes 44 in the lid 45. The separator tank 40 can be located above or below ground and should be in close proximity to the collection tank 20 and sand filters 90A and 90B (FIG. 4A).

Debris-separated water 35 from the collector tank 20 enters grease/oil/water separator tank 40 through a four-inch turned down pipe 52 located at the top left-hand corner 51 of the settling tank 50. In order for the debris-separated water 35 to pass out of the tank 50, it must travel diagonally to the opposite side of tank 50 where four-inch turned down elbow pipe 62 extends through baffle 55. Pipe 62 is positioned at the right-hand corner 61 of trap tank 60 and provides an avenue for the debris separated water 35 to enter the trap tank 60.

The diagonal flow path which the debris-separated water 35 must travel to enter the trap tank 60, has a slowing and gentle effect upon water flow such that oil begins to separate from the debris-separated water 35 in the settling tank 50 while suspended solids (sludge) indicated by numeral 54 are allowed to fall to the bottom of the settling tank 50 such that debris-separated water 35 becomes sludge-separated water 56.

The sludge-separated water 56 enters trap tank 60 through pipe 62 and must travel diagonally to the opposite end of trap tank 60 where it enters 4" turned-down PVC pipe 68 which extends through baffle 65 at the upper left-hand corner of pump tank 70. Turned down pipe 68 extends downward to approximately a foot above the bottom of the trap tank. Upon entering the trap tank 60, the slow and gentle cross-flow of the sludge-separated water 56 allows oil and grease having a specific gravity less than that of water (indicated by numeral 67) to become trapped at the top of this oil-separated water 66. The oil-separated water 66 escapes from the trap tank through the deeply submerged opening in the pipe 68, with the oil separated water 66 proceeding to pump tank 70.

The pump tank 70 is provided with a submersible sewage ejector pump 76 for pumping the oil-separated water received from the trap tank 60 to the sand filters 90A and 90B (FIG. 4A). In the prototype of the present invention the ejector pump operated at ½ HP and 165 GPM at 30 PSI. Pump 76 is located at the right rear end and bottom of tank 70. Pump 76 pumps the oil-separated water into discharge line 78 which is a two-inch schedule 40 PVC pipe approximately 37 inches long which forms a 90 degree angle in exiting tank 70 where it connects to PVC pipe 80 which channels the oil separated water 66 to sand filter tanks 90A and 90B (FIG. 4A). Pump 76 maintains the water level in the pump tank 70 at a lower level than in trap tank 60, resulting in a continuous flow of water through elongated pipe 68.

Discharge line 78 has a brass flow check valve which is triggered by a mercury float switch 77 in the ejector pump 76 when the water level reaches approximately 100 gallons and shuts off the pump 76 when the water level is approximately 25 gallons. In operation in the prototype of the present invention, the ejector pump 76 operated intermittently in one minute intervals in which the pump 76 was in an ON mode for approximately 35 second and in an OFF mode for approximately 25 seconds.

With reference to FIGS. 1 and 4A, oil-separated water 66 exiting pump tank 70 through PVC pipe 80 is channeled into sand filter tanks 90A and 90B via 2½ inch spray bars 100A and 100B each having four 90 degree turned down elbows 93. In the prototype of the present invention the spray bars 100A and 100B are located approximately 4" from the top of each sand filter tank 90A and 90B and branch out to form an "H" shape in the form of the 90 degree turn down elbows 93.

The oil-separated water 66 exits the elbows 93 and is deposited onto splash blocks 91 which lie atop sand layer 92. The elbows 93 and splash blocks are positioned such that the oil-separated water 66 is evenly distributed onto the sand layer 92.

Tanks 90A and 90B receive a maximum water flow of 165 GPM split evenly between the tanks 90A and 90B so that 82.5 GPM pass through spray bars 100A and 100B with each elbow realizing a flow of approximately 20 GPM.

Each of the tanks 90A and 90B is a precast concrete tank holding a volume of approximately 1050 gallons (10' by 5' by 51"). Each tank has a top sand layer 92 of some 28 inches in depth of coarse well point sand (96% of the sand would pass through #8 wire mesh, and 1.9% of the sand would pass through #50 wire mesh). Below the sand layer 92 is a middle layer 94 of river gravel which extends for approximately four inches below the sand layer 92 (99% of the river gravel would pass through ⅜" wire mesh and 3% of the river gravel would pass through a #10 wire mesh). Supporting the middle layer 94 is a bottom layer 95 of smooth river run stone which extends for eight inches below the middle layer 94 (100% of the river run stone would pass through 2" wire mesh and 1% of the river run stone would pass through 1½" wire mesh).

As gravity draws the oil-separated water 66 down through the sand layer 92, river gravel layer 94 and river run stone layer 95, remaining suspended solids, trace oil, grease balls and hydrocarbons emanating from petroleum distillates are removed from the oil-separated water 66 such that a filtered hydrocarbon-separated water 112 collects at the bottom of each sand filter tank 90A and 90B.

Figure 4B:
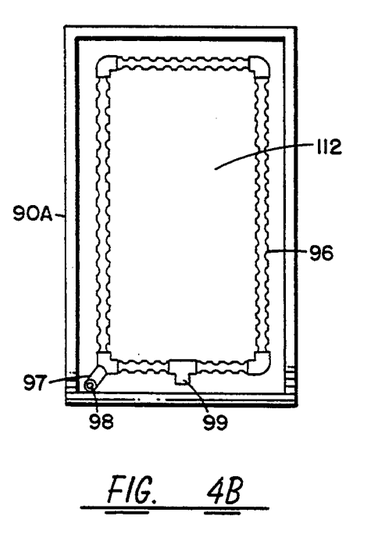
FIG. 4B is a top schematic view of the bottom of a sand filter tank according to the present invention.

With reference to FIGS. 4A and 4B, located within the bottom layer 95 of river run stone is a six-inch corrugated perforated PVC pipe 96 (P.T.I. Corr-A-Flex ™, Highway Peipe AASHTO M-252) with four slots per corrugation valley. The layer of river run stone 95 contains sufficient voids to allow the hydrocarbon-separated water 112 to pass freely such that the looped pipe 96 is submerged and surrounded by the hydrocarbon-separated water 112 which flows into the slots provided in the sides of pipe 96.

The perforated PVC pipe 96 in each of the sand filters 90A and 90B forms a complete loop and connects to four inch PVC pipes 110A and 110B at connection point 99 of each respective sand filter tank. Pipes 110A and 110B are located approximately five inches from the bottom of the each respective tank 90A and 90B. PVC pipes 110A and 110B connect sand filter tanks 90A and 90B, respectively to balance tank 130 via 4"-PVC pipe 120 (See FIG. 1).

Figure 5:
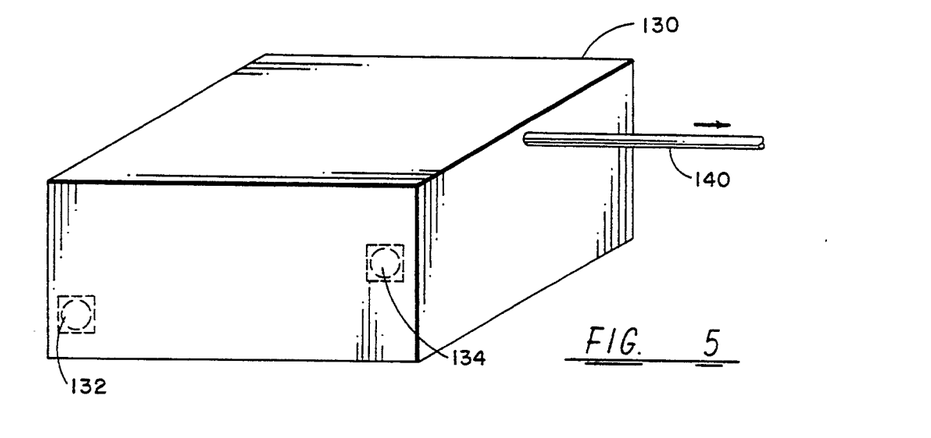
FIG. 5 is a schematic illustration of the balance tank according to the present invention.

The hydrocarbon-separated water 112 flows by gravity from the sand filter tanks 90A and 90B to the balancing tank 130 (FIG. 5). The flow rate for each sand filter 90A and 90B is approximately 1.96 gallons per square foot of surface area. However, if design parameters dictate, an additional pump can be added to transport water from the sand filter tanks 90A and 90B to the balancing tank 130.

An overflow pipe 98 is attached to the looped PVC pipe 96 via pipe connection 97. The overflow pipe 98 vertically extends approximately 40 inches and should be approximately four inches below the top of each respective sand filter tank 90A and 90B and four inches above sand layer 92.

With reference to FIG. 5, balance tank 130 receives the hydrocarbon-separated water 112 from sand filters 90A and 90B through four inch PVC pipe 120. Balance tank 130 is a 1050 gallon precast concrete tank (10' by 5' by 51"). The balance tank 130 in the prototype of the present invention was located underground; however, the balance tank 130 as with the other tanks of the present invention can be located above or below ground as long as pumps are added to the system when a desired water flow cannot be achieved by gravity.

Located inside of the balance tank are low water level safety switch (pump control switch) 132 and solenoid valve float switch 134. Safety switch 132 is tripped when the water level in the balance tank dips below 100 gallons and sends a signal to shutoff recirculating pump 150 (see FIG. 1) so that pump 150 is not damaged for lack of water. Recirculating pump 150 is a 10 HP close coupled end suction centrifugal pump rated at 110 GPM at 70 PSI and is mounted to a concrete pad (not shown in FIG. 1).

When water level in balance tank 130 goes below 300 gallons, solenoid valve float switch 134 energizes the solenoid valve 320 located in the tap water line 315 which connects to rinse tank 280 (see FIG. 1) so that tap water is added to the rinse tank 280 and channeled through pipes 300B and 310 to balance tank 130.

After water has exited the balance tank 130 and passed through the recirculating pump 150 the water is directed to separator 170. The separator 170 used in the prototype of the present invention is a Demco TM Cyclone Separator (Spec #4 "H"-275#). Separator 170 removes all solids which exceed six microns in size. As has been mentioned, the captured solids are discharged at the bottom of separator 170 by means of water sprayed into a sludge cart 180. Water is prevented from overflowing form the sludge cart 180 in that the cart 180 is provided with a galvanized two-inch nipple (not shown in FIG. 1) at the top of the cart which connects to a two inch PVC pipe 190 which returns any overflow water from the sludge cart 170 to pump tank 70 of the grease/oil/water separator tank 40. Thus, the hydrocarbon separated water 112 upon being further clarified by separator 170 becomes new wash water 307 and is discharged at the top of the separator 170 into pipe 200.

The two-inch PVC pipe 200 bifurcates to form filter-line pipe 210A and soap tank line pipe 210B (see FIG. 1). Filter line pipe 210A brings the new wash water from the separator 170 to carbon filter 240. Both pipe 210A and 210B are provided with gate valves 220 and 230, respectively. Gate valves 220 and 230 are brass gate valves which are manually adjusted to regulate flows and pressures to carbon filter 240 and to soap water tank 250. In operation, gate valve 220 is maintained in a full open position and gate valve 230 is adjusted to achieve a desired pressure in the carbon filter 240.

Carbon filter 240 in the prototype of the present invention is a Culligan TM Hi-flow Cullar Filter Model 422 with Cullar "G" Media which has been demonstrated to have superior soap removing characteristics. Different filters could be substituted for the Culligan TM model mentioned upon demonstrating a comparable soap-removing capability.

Figure 6:
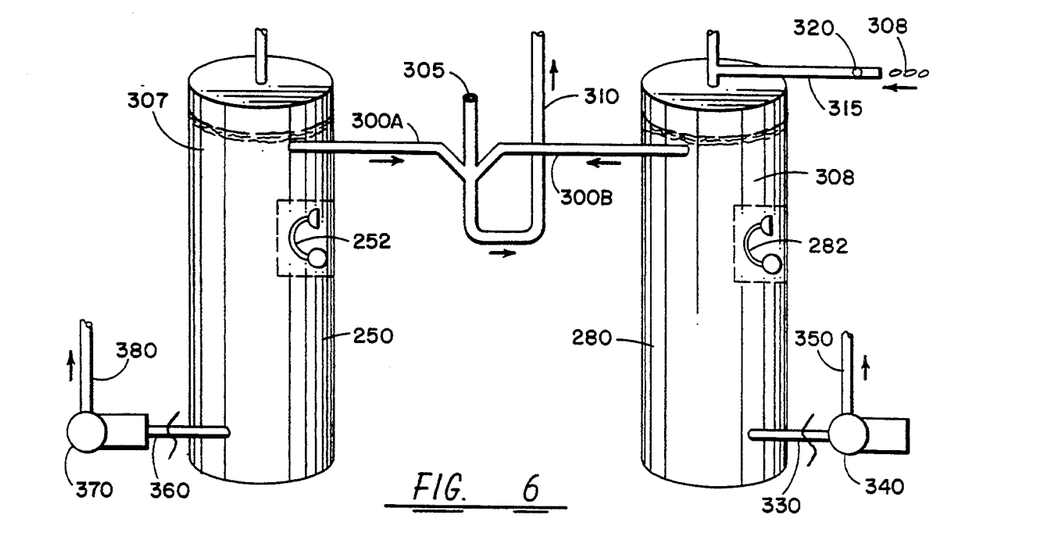
FIG. 6 is a schematic illustration of the rinse tank and soap tank according to the present invention.

The new wash water which passes through the carbon filter 240 becomes new rinse water and is channeled into two inch PVC pipe 270 which brings this filtered water to rinse tank 280. When there is no demand for rinse water in the rinse tank, the solenoid valve 290 located in the pipe 270 is closed and is open when there is demand for rinse water in the rinse tank 280, solenoid valve 290 being connected to float switch 282 in the rinse tank 280 (FIG. 6). Valve 295 located in pipe 270 is adjustable to attain a desired pressure in the carbon filter 240.

With reference to FIG. 6, wash water tank 250 is a 350 gallon polyethylene covered container (4' in diameter by 10') and is provided with a float switch 252 which activates recirculating pump 150 when water is needed and disengages recirculating pump 150 when enough water is present in the tank 250. A four inch PVC pipe tank overflow line 300A located about 12" from the top of the wash water tank 250 returns overflow new wash water 307 by gravity to the balancing tank 130 via four inch PVC pipe 310. Discharge line 360 (which is not a part of the closed-loop system of the present invention) is a three inch PVC pipe fitted with a ball check valve and connected to 5 HP pump 370 which allows water in the tank 250 to be directed to washing equipment through three inch PVC pipe 380.

Still with reference to FIG. 6, rinse water tank 280 is a 350 gallon tank identical in construction to wash water tank 250. Rinse water tank 280 is provided with a solenoid valve float switch 282 which opens the solenoid valve 290 (FIG. 1) when additional new rinse water 308 is required in the rinse water tank 280 and activates the recirculating pump 150. The float switch 282 closes the solenoid valve 290 when a desired level of rinse water is reached. Rinse tank overflow line 300B consists of four inch PVC pipe and is located 12" from the top of tank 280 and returns overflow new rinse water 308 by gravity to balance tank 130 via four inch PVC pipe 310. A three inch PVC rinse water discharge line 330 (not a part of the closed loop system of the present invention) provided with a three inch ball check valve connects rinse water tank 280 to 5 HP pump 340 and three inch discharge line 350. Discharge line 350 is connected to a washing system for purposes of providing the washing system with rinse water. Overflow lines 300A and 300B and pipe 310 are connected to an air pipe 305 which provides aeration to the system.

Figure 7:
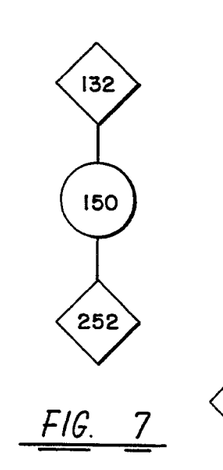
FIG. 7 is a schematic illustration demonstrating the electrical connection between the float switch in the soap tank and the safety float switch in the balance tank with the recirculating pump (system pump) of the present invention.

FIG. 7 is a schematic diagram demonstrating that the recirculating pump 150 is electrically connected to the safety switch 132 and solenoid valve float switch 134 of the balance tank 130, and to the float switch 252 of wash water tank 250.

Figure 8:
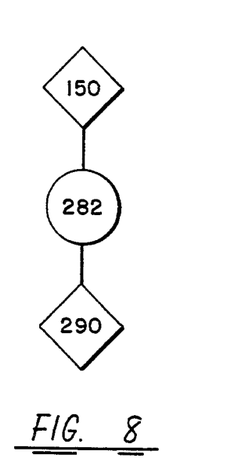
FIG. 8 is a schematic illustration demonstrating that the float switch in the rinse water tank electrically connects to the recirculating pump and to a solenoid valve on the discharge side of the carbon filter according to the present invention.

FIG. 8 is a schematic diagram illustrating that float switch 282 of rinse tank 280 is electrically connected to solenoid valve 290 and to recirculating pump 150.

Figure 9:
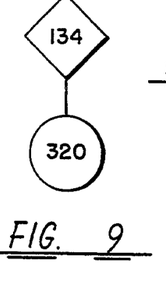
FIG. 9 is a schematic illustration demonstrating the electrical connection between the solenoid float switch in the balance tank with the solenoid valve in the tap water line of the rinse water tank.

FIG. 9 is a schematic diagram illustrating that float switch 134 of the balancing tank 130 is electrically connected to the solenoid valve 320 on tap water line 315.

Figure 10:
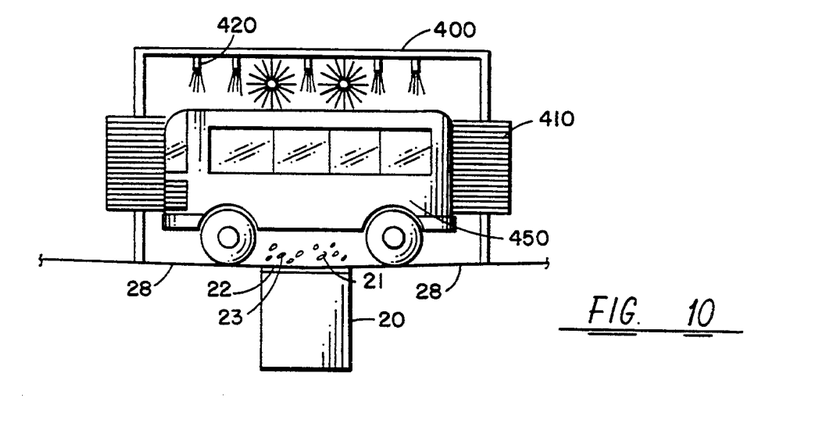
FIG. 10 is an exemplary illustration showing an object (a bus) being washed in a wash system with all the water utilized in the wash being collected in the sloped gradient of a wash bay which leads to the grate of the collection tank of the present invention.

FIG. 10 is an exemplary illustration showing that grate 22 of the collection tank 20 of the present invention is surrounded in all directions by a sloped gradient 28 of a wash bay. A wash system 400 provided with wash brushes 410 and water spray nozzles 420 is washing a bus 450. All of the water used to wash the bus 450 (which does not evaporate) is collected in collection tank 20 due to the fact that the wash water and rinse water flow down the sloped gradient 28 and through grate 22 into collection tank 20. The discharge line 380 connected to the wash water tank 250 and the discharge line 350 connected to the rinse water tank 280 are connected (connection not shown) to the wash system 400 so that the same water can be used over and over again.

Thus, to review the operation of the present invention, the collection tank 20 receives all wash and rinse water and separates the heavy solids such as sand, gravel, rocks, road film, etc. from the collected water. Heavy particles fall to the bottom of collection tank 20 and are removed when necessary by a licensed environmental waste hauling firm.

From the collection tank the water is channeled to the grease/oil/water separation tank 40 where the water is first introduced to the settling tank 50 where the velocity of the water is reduced allowing the oil and water to separate while allowing the suspended solids and sludge from the wash water to sink to the bottom of the separation tank 40. Sludge from the bottom of the separation tank 40 is to be removed by an environmental waste hauler at same time as filtering sand 92 and the carbon in carbon filter 240 is replaced.

From the separation tank 40 the water flow continues to trap tank 60 where oil and grease and other particles having a specific gravity less than water float to the top of the trap tank 60 to be collected at regular intervals by a licensed grease and oil hauler.

Pump tank 70 receives the de-oiled and/or degreased water from the trap tank 60 and operates as a holding tank for providing oil-separated water, which is pumped by submersible pump 76, to the sand filter tanks 90A and 90B.

The water introduced to the sand filter tanks 90A and 90B is drawn down through the sand layer 92, pea gravel layer 94 and stone rock layer 95 through gravity which causes the suspended solids and trace oil to be captured by a filtering action. The river run stone 95 has sufficient voids to allow the water to pass freely into the collector loop 96 and to thereafter flow into the balancing tank 130.

The balancing tank 130 acts as a reservoir to control the amount of water in the closed loop system 10 of the present invention. The water which is carried off by vehicles, by evaporation and by particle absorption is replaced within this tank 130. When additional water is needed in the balance tank, the float switch 134 in the balance tank 130 activates the solenoid valve 320 in the tap water line 315 which leads to the rinse water tank 280. Tap water 309 flows into the rinse tank 280 and on to the balance tank 130.

From the balance tank 130 water is channelled to the separator 170 which creates new wash water which is thereafter directed to the wash water tank 250 and to the carbon filter 240.

Depending on the degree to which valve 230 in the pipe 210B which leads to the wash water tank 250 and the valve 295 on the discharge side of the carbon filter 240 are open regulates the amount of pressure in the carbon filtering element of carbon filter 240 (filtering is enhanced at higher pressures). From the carbon filter the new rinse water is collected in the rinse tank 280. The rinse tank 280 and wash water tank 250 are the receptacles for providing rinse and wash water to a washing system such as washing system 400 shown in FIG. 9.

The above discussion has described a one hundred gallon per minute universal recycled water system according to a prototype of the present invention which is used in conjunction with a wash system designed to wash buses. However, the teachings of the present invention are applicable and can be adapted for use with a wide variety of wash systems so that the rate and size of the recycled water system can be tailored to accommodate a given wash system.

Design parameters to be considered are how many gallons are needed per minute in a wash system, how often is it desired to change filtering elements, and what elements are being washed off a vehicle or object. Filters can be added to the system to remove specific contaminants and additional pumps and timers can be added as needed.

Therefore, in light of the above discussion, the foregoing detailed description of the invention is intended to be illustrative and non-limiting. Many changes and modifications are possible in light of the above teachings. Thus, it is understood that the invention may be practiced otherwise than as specifically described herein and still be within the scope of the appended claims.

What is claimed is:

1. A recycled wash water system, comprising:
   a collection tank for collecting and combining rinse water and wash water from a washing system immediately after an object is washed, said collection tank separating debris from the rinse water and wash water to create debris-separated water;
   a grease/oil/water separator tank, connected to said collection tank, having means for separating grease and oil from the combined water to create an oil-separated water;
   sand filtering means, connected to said grease/oil/-separator tank, for removing suspended solids and trace oil from the oil-separated water received from said grease/oil/water separator tank, said sand filtering means substantially removing hydrocarbons emanating from petroleum distillates from said oil-separated water to create hydrocarbon-separated water;
   a balancing tank, connected to said sand filtering means, for receiving the hydrocarbon-separated water from the sand filtering means, said balancing tank being provided with a water-level control means for regulating an amount of water in said balancing tank;
   a recirculating pump connected to said balancing tank for pumping the hydrocarbon-separated water from the balancing tank, said recirculating pump being electrically connected to a pump control means in said balancing tank;
   separator means, connected to the recirculating pump, for separating solid particles from the separated water to create new wash water, said separating means having a new wash water outlet;
   carbon filter means, connected to said new wash water outlet of said separator means, for removing soap particles from the new wash water to create new rinse water;
   a rinse water tank connected to the carbon filter means for holding the rinse water received from the carbon filter means; and a wash water tank, also connected to said new wash water outlet of said separator means, for holding the new wash water received from said separator means.

2. A system according to claim 1, wherein:
said water level control means comprises a solenoid float switch in said balancing tank which is electrically connected to a solenoid valve located in a tap water pipe leading to said rinse water tank.

3. A system according to claim 1, further comprising means for regulating the pressure in said carbon filter means.

4. A system according to claim 1, wherein said pump control means in said balancing tank comprises a water level safety switch which turns off said recirculating pump when the water level in said balancing tank drops below a predetermined level.

5. A system according to claim 1, further comprising:
an air pipe;
a rinse tank overflow pipe line connected to said rinse tank;
a wash water tank overflow pipe line connected to said wash water tank;
a balancing tank return pipe line connected to said air pipe, to said rinse tank overflow pipe line, and to said blancing tank return pipe line, said balancing tank return pipe connecting to said balancing tank.

6. A system according to claim 1, wherein said grease/oil/water separator tank comprises:
a settling tank;
a trap tank;
a pump tank; and
wherein said settling tank, said trap tank and said pump tank are integrally connected, said pump tank being provided with a pump for pumping the oil-separated water to said sand filtering means.

7. A system according to claim 6 wherein:
two sides of said grease/oil/water separator tank, a first baffle and a second baffle define the boundaries of said trap tank, said two sides and said first and second baffles being integrally connected.

8. A system according to claim 6, wherein:
said debris-separated water from said collection tank enters said settling tank through a first turned down pipe located at a top corner of said settling tank and proceeds diagonally across said settling tank such that suspended solids fall to the bottom of said settling tank to create sludge-separated water which enters said trap tank through a second turned down pipe located diagonally across from said first turned down pipe.

9. A system according to claim 8, wherein:
the sludge-separated water which enters said trap tank through said second turned down pipe travels diagonally across said trap tank such that oil and grease having a specific gravity less than water floats to the top of the trap tank so as to create oil-separated water which enters an elongated turned down pipe at at an underwater-diagonal location from said second turned down pipe, said oil separated water proceeding through said elongated turned down pipe to said pump tank.

10. A system according to claim 1, wherein said sand filtering means comprises:
at least one sand filled tank having perforated pipe which is formed in a loop at the bottom of said at least one sand filled tank for collecting the hydrocarbon separated water, said perforated pipe connecting to said balancing tank.

11. A system according to claim 1, wherein:
a float switch in said wash water tank is electrically connected to said recirculating pump.

12. A system according to claim 1, wherein:
a float switch in said rinse tank is electrically connected to said recirculating pump.

13. A system according to claim 12, wherein:
said float switch in said rinse tank is electrically connected to a solenoid valve located in a rinse water input pipe which connects said carbon filter means to said rinse water tank.

14. A system according to claim 1, wherein said separator means removes solid particles exceeding six microns from the hydrocarbon-separated water to create the new wash water.

* * * * *